United States Patent [19]

Grimm

[11] Patent Number: 4,545,470
[45] Date of Patent: Oct. 8, 1985

[54] NARROW TOLERANCE RANGE SLIP CLUTCH

[75] Inventor: Duane H. Grimm, Rockford, Ill.

[73] Assignee: Sundstrand Corporation, Rockford, Ill.

[21] Appl. No.: 560,906

[22] Filed: Dec. 14, 1983

[51] Int. Cl.[4] ............................................. F16D 43/20
[52] U.S. Cl. .................... 192/56 R; 192/8 R; 188/134
[58] Field of Search ............... 192/56 R, 150, 70.23, 192/70.15, 93 A; 188/134

[56] References Cited

U.S. PATENT DOCUMENTS

| | | | |
|---|---|---|---|
| 2,065,244 | 12/1936 | Richards | 192/56 R |
| 2,699,856 | 1/1955 | McCann | 192/56 R |
| 2,913,082 | 11/1959 | Becknell | 192/56 |
| 3,249,187 | 5/1966 | McDowall | 192/56 R |
| 3,285,377 | 11/1966 | Rasmussen | 192/8 |
| 3,292,754 | 12/1966 | Peterson | 192/56 R |
| 3,329,243 | 7/1967 | Gibb | 188/134 |
| 3,367,456 | 2/1968 | Bohnhoff | 188/134 |
| 3,429,407 | 2/1969 | Orwin et al. | 192/56 R |
| 3,497,044 | 2/1970 | Kalns | 192/8 |
| 3,499,511 | 3/1970 | Bouhot | 192/56 |
| 3,542,162 | 11/1970 | Kerr | 188/134 |
| 3,547,242 | 12/1970 | Braggins | 192/56 R |
| 3,596,740 | 8/1971 | Nau | 188/134 |
| 3,734,253 | 5/1973 | Derossi | 192/8 |
| 3,797,620 | 3/1974 | Haller | 192/56 |
| 4,030,578 | 6/1977 | Cacciola et al. | 188/134 |
| 4,176,733 | 12/1979 | Turckler | 192/8 R |
| 4,294,340 | 10/1981 | Kunze | 192/56 R |
| 4,460,078 | 7/1984 | Heide et al. | 192/93 A |

*Primary Examiner*—Henry C. Yuen
*Attorney, Agent, or Firm*—Wood, Dalton, Phillips, Mason & Rowe

[57] ABSTRACT

A narrow tolerance range slip clutch has a friction clutch and a ball ramp mechanism, with one or more springs associated with the friction clutch and ball ramp mechanism to exert a clamp load on the friction clutch and to establish a trip torque setting on the ball ramp mechanism. With a driving torque below a trip torque setting, there is a normal drive through the slip clutch. When the driving torque exceeds the trip torque setting, the clamp load on the friction clutch is reduced by means of a force balance between a ball ramp axial force and a clutch reaction force also proportional to input torque which are functions of the input torque and spring forces acting on the ball ramp mechanism and the friction clutch. With this force balance, the clamp load on the friction clutch is relieved sufficiently to avoid transmission of torque above the trip torque setting, with the result that there is continuous power flow through the slip clutch and after relief of the overloading, the slip clutch automatically resets itself to a full clamp load in transmitting normal torque levels.

17 Claims, 5 Drawing Figures

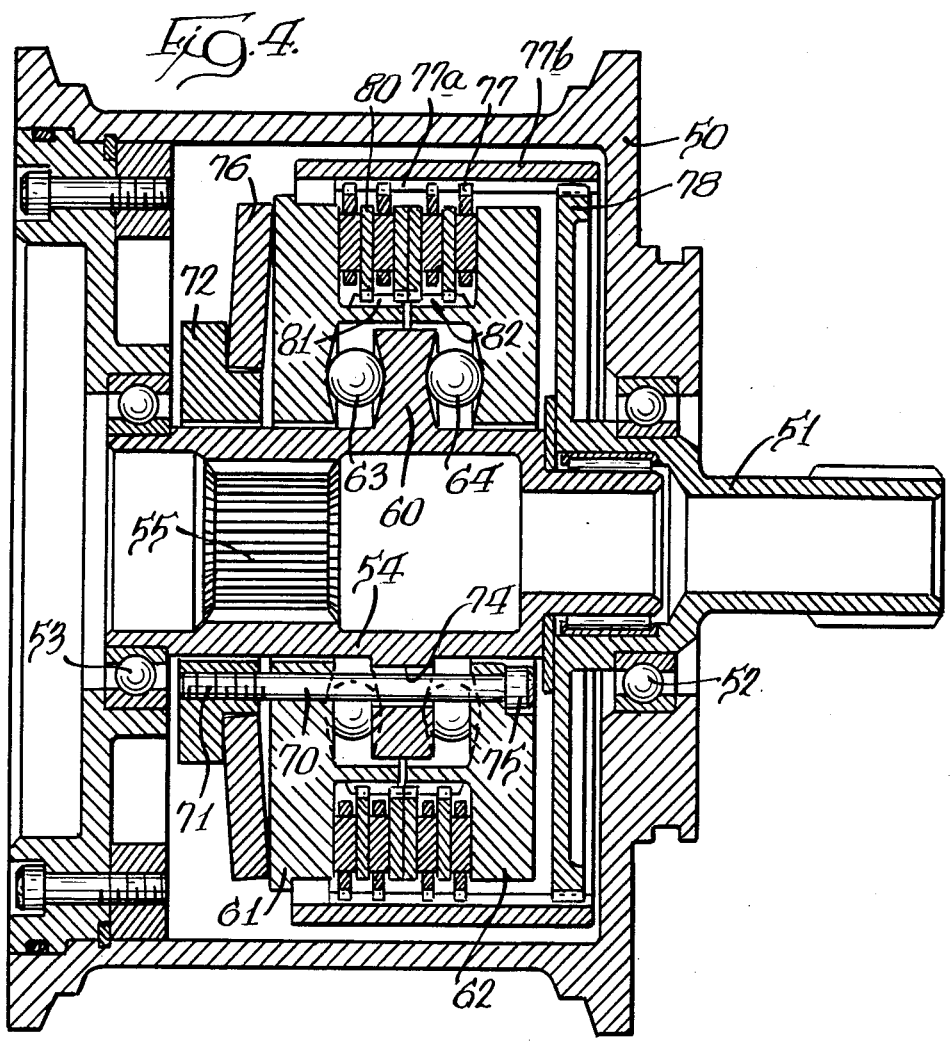
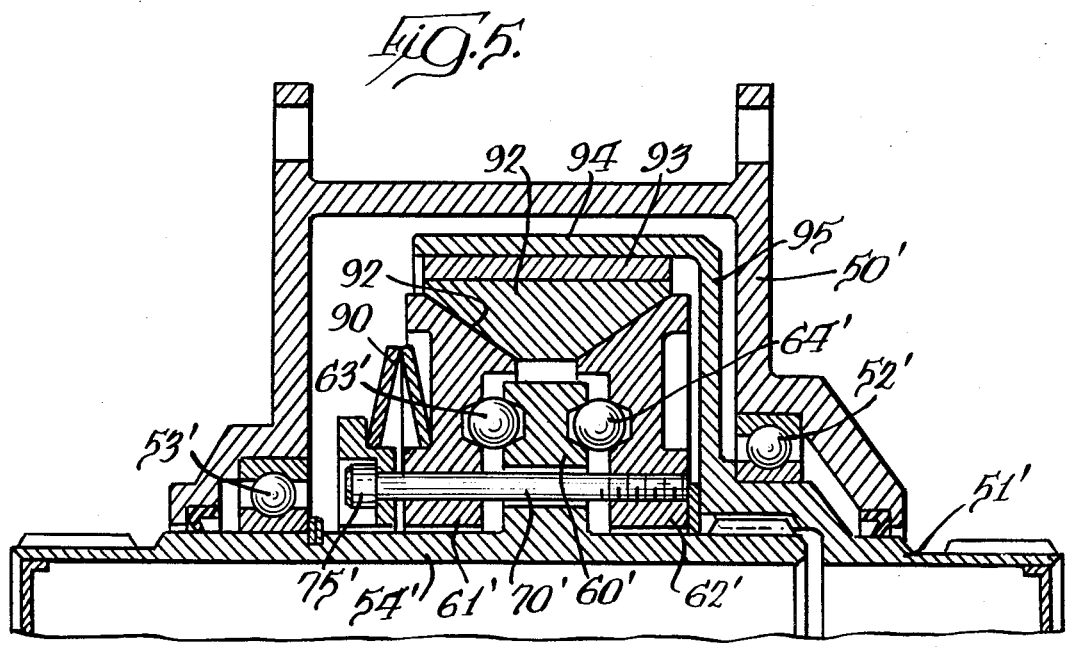

NARROW TOLERANCE RANGE SLIP CLUTCH

DESCRIPTION

1. Technical Field

This invention pertains to a power-transmitting device and, more particularly, to a narrow tolerance range slip clutch. The device comprises a friction clutch and a ball ramp mechanism with associated structure. The clamp load on the friction clutch is relieved upon the occurrence of a driving torque in excess of a trip torque setting as sensed by the ball ramp mechanism, with continued power flow through the clutch and the clutch automatically resets itself when the torque no longer exceeds the trip torque setting.

2. Background Art

Torque levels in mechanical drive systems from externally applied overloads or high inertial loads must be limited to avoid unnecessarily large and heavy drive system components. It has been conventional to use torque limiters, with one example of such device being shown in Twickler U.S. Pat. No. 4,176,733. The Twickler patent discloses a torque limiter assembly utilizing a brake and a ball ramp mechanism. When the torque exceeds a predetermined value, the ball ramp mechanism operates to set the brake for limiting the torque.

It is also known to use slip clutches for limiting maximum torque levels, but such devices have a large torque tolerance range that is directly proportional to the generally large variability of the coefficient of friction.

DISCLOSURE OF THE INVENTION

A primary feature of the invention is to provide a power-transmitting device and, more particularly, a narrow torque tolerance range slip clutch utilizing a friction clutch and a ball ramp mechanism. The ball ramp mechanism establishes a lower limit of the torque-transmitting capacity of the slip clutch and the upper limit of the torque-transmitting capacity is determined by a force balance between the ball ramp mechanism, a part of the friction clutch and spring means. This unique combination of structure provides a slip torque range between minimum and maximum values which is much narrower than the variation of the coefficient of friction of the friction clutch.

A conventional slip clutch used to limit maximum torque levels has a large torque tolerance range that is directly proportional to the generally large variability of the coefficient of friction. As an example, for a variation of the coefficient of friction of 3:1, the narrow tolerance range slip clutch embodying the invention can provide a slip clutch with a slip torque variation of only 1.2:1.

In carrying out the invention, the narrow tolerance range slip clutch has a friction clutch and a ball ramp mechanism wherein below a trip torque setting the drive is transmitted through the ball ramp mechanism and the friction clutch, with there being a clamp load on the friction clutch and with the ball ramp mechanism being ineffective to vary the clamp load. Above the trip torque setting, the ball ramp mechanism becomes operative to relieve part of the clamp load on the friction clutch that would otherwise transmit unacceptable overloads. This is accomplished by establishing a force balance between an axial force at the ball ramp mechanism, which is a function of input torque; a ball ramp spring, which sets the trip torque setting; a clutch reaction force, proportional to input torque; and a clutch spring force. As a result, there is a narrower slip torque range than with a conventional constant force friction slip clutch. As will be evident from the embodiments of the invention disclosed hereinafter, the functions of the ball ramp spring and the clutch spring can be performed by a single spring.

Another feature of the invention resides in the narrow tolerance range slip clutch being operable to avoid transmitting unacceptable overloads, but with there being continuous power flow through the clutch when a trip torque setting is exceeded and with the clutch automatically resetting itself when the driving torque returns to a normal level.

An object of the invention is to provide a power-transmitting device associated with a drive input and a drive output comprising, the combination of a friction clutch and a ball ramp mechanism, the friction clutch having frictionally engaged elements associated at least one with the drive input and one with the drive output, the ball ramp mechanism having a pair of relatively movable discs with opposed ball ramps and with one of the discs in driving connection with one of the drive input and drive output and a ball positioned therebetween in said ball ramps, the combination further including spring means acting on the ball ramp mechanism and the friction clutch to urge said discs toward each other to establish a trip torque setting and to urge said elements toward each other with a compressive force to establish a drive through the friction clutch, and means operative above the trip torque setting to establish a force balance between said spring means, a force exerted by the coaction of the ball with the ball ramps and a reaction force at the friction clutch to maintain a compressive force on the friction clutch which will permit continued but limited torque transmission.

BRIEF DESCRIPTION OF THE DRAWINGS

FIG. 4 is a central vertical section of a second embodiment of the invention; and FIG. 5 is a fragmentary central vertical section, similar to that taken in FIG. 4, of a further embodiment of the invention.

BEST MODES FOR CARRYING OUT THE INVENTION

Figure 1:
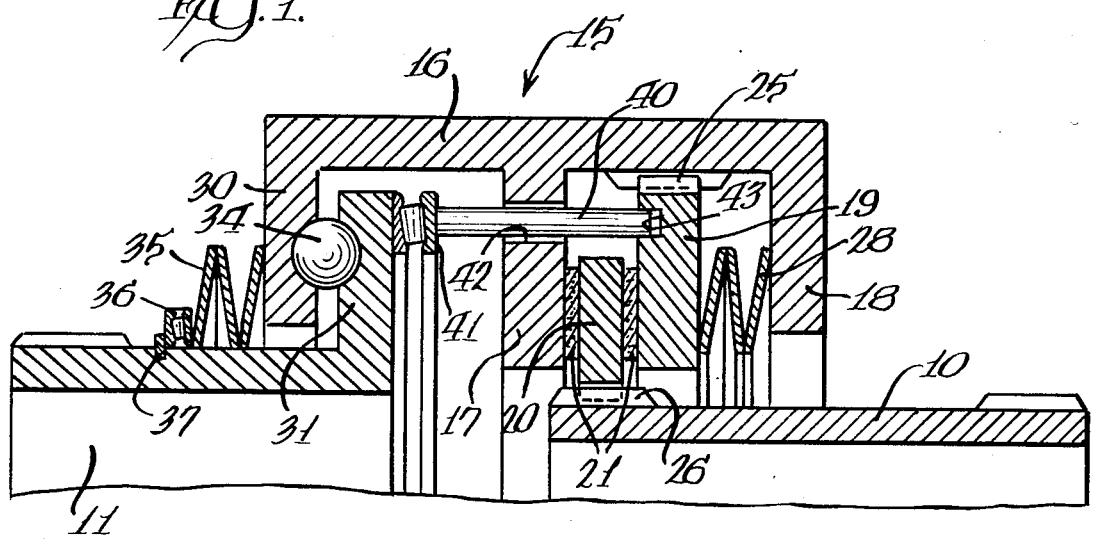
FIG. 1 is a fragmentary vertical section of one embodiment of the invention.

A first embodiment of the narrow tolerance range slip clutch is shown in FIG. 1 in association with a rotatable input shaft and a rotatable output shaft 11 which are in axial alignment. The slip clutch, indicated generally at 15, has a clutch housing 16 in surrounding relation with adjacent ends of the input and output shafts and has a pair of spaced-apart, inwardly-extending annular flanges 17 and 18 which encompass a clutch pack including clutch elements 19 and 20. The clutch elements are interleaved and are in friction engagement either directly or as shown through the intermediary of friction pads 21. The friction clutch element 19 is keyed at 25 to the interior of the clutch housing 16 and the clutch element 20 is keyed at 26 to the outer periphery of the input shaft 10. A clutch load spring 28 engages between the clutch housing flange 18 and the clutch element 19 whereby a clamp load is exerted on the friction clutch elements which are compressed between the clutch housing flange 17 and the spring 28. The loading on the friction clutch by the clutch load spring 28 is several times the loading of a conventional slip clutch. This is possible because the slip clutch disclosed herein has a floating system which is not grounded to a fixed member.

The narrow tolerance range slip clutch further includes a ball ramp mechanism having a pair of spaced-apart discs with a disc 30 being shown as a flange extending inwardly from the clutch housing 16 and having an opening to surround the output shaft 11. A second disc 31 of the ball ramp mechanism is shown as being formed integrally with the output shaft 11 and extending radially outwardly therefrom. The ball ramp mechanism discs 30 and 31 are in opposed, spaced-apart relation and have opposed ball ramps 32 and 33, respectively, (FIG. 3) with inclined surfaces, as known in the art, in which a ball 34 is positioned. In normal operation of the narrow tolerance range slip clutch, when the driving torque is below a pre-set trip torque, the ball ramp discs 30 and 31 are at their closest spacing to each other and the ball 34 is fully seated in the ball ramps 32 and 33. The relation shown in FIG. 3 results when the torque exceeds the trip torque setting and there has been a slight relative rotation between the ball ramp discs 30 and 31.

A ball ramp spring 35 surrounds the output shaft 11 and engages between a thrust bearing 36 and the ball ramp disc 30. The ball ramp spring force establishes a trip torque setting for the slip clutch and the force may be varied by adjustment of the thrust bearing 36 axially of the output shaft 11. A retainer 37 fitted in the output shaft holds the thrust bearing 36 in position and the force of the spring can be increased by inserting a shim between the member 37 and the thrust bearing 36 or the thrust bearing could be mounted on a threaded member which can be rotated for axial adjustment along the output shaft 11.

A push rod 40 extends between a thrust bearing 41 associated with the ball ramp disc 31 and the clutch element 19. The push rod extends through an opening 42 in the clutch housing flange 17 and has an end extending into an opening 43 in the clutch element 19. As seen in FIG. 1, the push rod 40 is of a length whereby, in normal operation of the slip clutch below the trip torque setting, the end of the push rod 40 does not fully seat in the opening 43. When the ball ramp mechanism discs move to the position of FIG. 3, the clearance lengthwise of the push rod 40 is taken up to have the end thereof fully seated in the opening 43 in the clutch element 19.

The embodiment of FIG. 1 would have at least one additional ball 34 and associated ramp structure as well as an additional push rod 40 for balance.

In normal operation with the parts positioned as shown in FIG. 1, the clearance at the end of the push rod 40 decouples the ball ramp mechanism from the slipping resistance established by the clutch. Rotation of the input shaft 10 results in rotation of the output shaft 11 by transmission of drive through the friction clutch, the clutch housing and the ball ramp mechanism.

Figure 2:
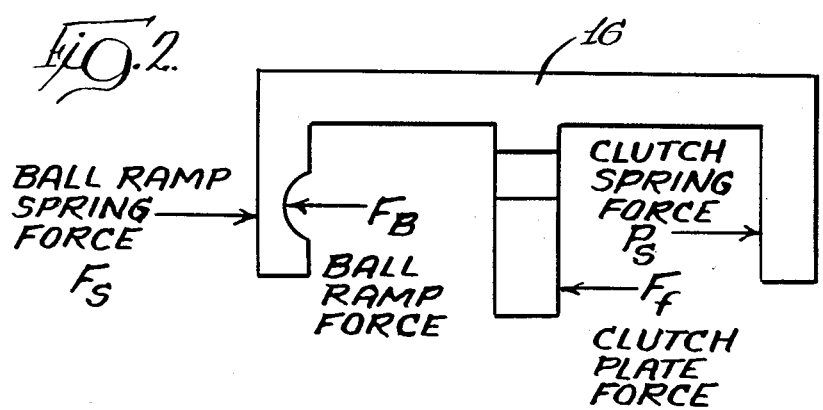
FIG. 2 is a free-body force diagram of the forces which achieve a force balance.
Figure 3:
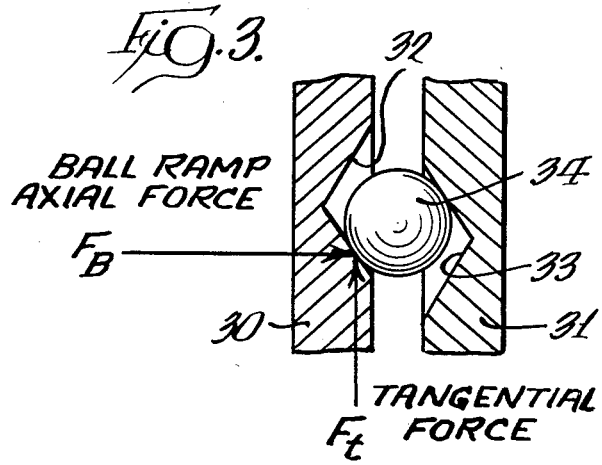
FIG. 3 is a fragmentary showing of a ball ramp mechanism whereby a ball ramp axial force is established upon a transmitted torque exceeding a trip torque setting.

The ball ramp spring 35 establishes a trip torque setting whereby, when the torque being transmitted exceeds the trip torque setting established by ball ramp spring 35, the force resulting from the ball 34 acting on the slopes of the ball ramps 32 and 33 has an axial component force $F_B$ and a tangential component force $F_t$, as identified in FIG. 3. The ball ramp axial force $F_B$ is shown acting on the clutch housing 16 in the free-body force diagram of FIG. 2, and exerts a force to slightly separate the ball ramp discs and fully seat the push rod 40. The axial motion imparted in separating movement of the discs of the ball ramp mechanism is a minimal movement and merely sufficient to take up the clearance in the push rod force. This force is a function of the input torque. Additional forces acting on the clutch housing 16 are the spring force $F_S$ of the ball ramp spring 35, the force $P_S$ of the clutch load spring 28, and a clutch reaction force $F_f$ which is proportional to input torque. The clutch load spring 28 and ball ramp spring 35 define spring means associated with the clutch and the ball ramp mechanism.

Above the trip torque setting, a force balance is established between the forces acting in the directions shown in FIG. 2 to establish the upper limit of torque-transmitting capacity of the slip clutch. The force balance results in relieving only that portion of the loading on the friction clutch that would transmit unacceptable overloads. The ball ramp mechanism which is spring-loaded by the ball ramp spring 35 provides the axial force $F_B$ which is proportional to transmitted torque. This actual force relieves part of the clamp load on the friction clutch without imparting significant axial motion to the elements of the friction clutch. The ball ramp mechanism converts the driving torque in excess of a trip torque setting into axial forces that act directly on the friction clutch.

The force balance achieved is represented by the equation $F_S + P_S = F_B + F_f$. With the forces of the springs, namely, $F_S$ and $P_S$ being constant, it will be seen that there is a direct relation between the ball ramp force $F_B$ and the clutch reaction force $F_f$. As the ball ramp force goes up in proportion to increasing input torque, the clutch reaction force $F_f$ goes down, correspondingly reducing the clamp load on the friction clutch, whereby that portion of the clamp load which would transmit unacceptable torque overloads is relieved.

When the driving torque returns to a value equal to or below the trip torque setting, the friction clutch automatically resets itself with the push rod 40 returning to its clearance position. The power flow through the clutch is not disrupted during or after the existence of an excessive torque level.

With the force balance established between the forces illustrated in FIG. 2, it has been established by use of force and torque equations that the slip clutch disclosed herein has a narrower slip torque range than a conventional constant-force friction slip clutch.

A second embodiment of the invention is shown in FIG. 4. The slip clutch has a housing 50 which rotatably mounts an input shaft 51 by means of a bearing 52. The housing 50 also rotatably mounts by means of a bearing 53 an output shaft 54 which, as shown, has an opening with a spline 55 for connection to a shaft (not shown) extending outwardly of the housing 50.

The ball ramp mechanism is actually two of said mechanisms having a common center disc 60 formed as a peripheral flange on the output shaft 54 and positioned between a pair of outer discs 61 and 62. The center disc 60 and outer discs 61 and 62 are formed with opposed ball ramps similarly to those shown for the ball ramp discs in FIG. 3 and with there being a series of balls 63 and 64 positioned between the center disc 60 and the outer discs 61 and 62.

A series of axially-extending rods, one of which is shown at 70 extend through the outer discs 61 and 62 of the ball ramp mechanisms and are threadably fastened at 71 to a shouldered flange 72 loosely surrounding the output shaft 54. The rods 70 loosely extend through openings in the outer discs and an opening 74 in the center disc 60. An end of the rod is formed with a head 75 larger than the outer disc opening.

In the embodiment of FIG. 4, there is a single spring defining spring means which performs the function of both the clutch load spring 28 and ball ramp spring 35 of the embodiment shown in FIG. 1. This is the generally conical spring 76 which acts between the shouldered flange 72 and the external face of the outer disc 61 of the ball ramp mechanism. The force of the spring 76 acts to urge the outer discs 61 and 62 of the ball ramp mechanisms toward each other, with the spring force acting on the outer disc 62 through the head 75 on the rods 70. With the rods 70 only being fixed at the end threaded into the shouldered flange 72, it will be evident that the outer discs 61 and 62 have a limited amount of separating movement.

A clutch pack is positioned between the outer discs 61 and 62 of the ball ramp mechanisms and includes a series of elements 77 which are keyed at 77a to a ring 77b which is in driving engagment with a gear 78 integral with the input shaft 51. Another series 80 of clutch elements are keyed at 81 and 82 to flanges of the outer discs 61 and 62, respectively, of the ball ramp mechanisms.

The operation of the embodiment shown in FIG. 4 is the same as that shown in FIG. 1 wherein, in normal operation, with the driving torque being below a trip torque setting, the drive is from the input shaft 51 through the friction clutch, the outer discs of the ball ramp mechanism, the balls 63 and 64, and the center disc 60 of the ball ramp mechanism which is connected to the output shaft 54. When a trip torque setting as established by the force of the spring 76 is exceeded, there is a separating movement of the outer discs 61 and 62 of the ball ramp mechanisms which relieves a portion of the clamp load on the friction clutch and with there being the same force balance as described in connection with the embodiment of FIG. 1. After the driving torque returns to a normal operating level, the ball ramp mechanisms return to their normal position where the power flow through the slip clutch is that as previously described prior to the time the torque exceeds the trip torque setting.

A third embodiment is shown in FIG. 5 which is generally the same as that shown in FIG. 4, except for a variation in the structure of the friction clutch and the same reference numerals having been applied for generally the same structure with a prime affixed thereto.

In the embodiment of FIG. 5, the spring means urging the outer discs 61' and 62' of the ball ramp mechanisms toward each other is a Belleville spring 90 and the clutch embodies a cone-shaped clutch element 91 having a frusto-conical surface 92 which engages correspondingly-shaped surfaces at the periphery of the outer discs 61' and 62' and which carries a friction element 93 coacting with a ring 94 integral with a radial flange 95 of the input shaft 51'. The elements of the ball ramp mechanism have sufficient clearances whereby the loading exerted by the Belleville spring 90 exerts compression on the cone clutch element 91 to exert the clamp load on the friction clutch.

I claim:

1. A power-transmitting device associated with a drive input and a drive output comprising, the combination of a friction clutch and a ball ramp mechanism, the friction clutch having frictionally engaged elements drivingly connected at least one with the drive input and one with the drive output, the ball ramp mechanism having a pair of relatively movable discs with opposed ball ramps and with one of the discs in driving connection with one of the drive input and drive output and a ball positioned therebetween in said ball ramps, the combination further including spring means acting on the ball ramp mechanism and the friction clutch to urge said discs toward each other to establish a trip torque setting and to urge said elements toward each other with a compressive force to establish a drive through the friction clutch, and means operative above the trip torque setting to establish a force balance between said spring means, a force exerted by the coaction of the ball with the ball ramps and a reaction force at the friction clutch to maintain a compressive force on the friction clutch which will permit continued but limited torque transmission.

2. A power-transmitting device associated with a drive input and a drive output comprising, the combination of a friction clutch and a ball ramp mechanism, the friction clutch having frictionally engaged elements associated at least one with the drive input and one with the drive output, the ball ramp mechanism having a pair of relatively movable discs with opposed ball ramps and with one of the discs in driving connection with one of the drive input and drive output and a ball positioned therebetween in said ball ramps, the combination further including spring means acting on the ball ramp mechanism and the friction clutch to urge said discs toward each other to establish a trip torque setting and to urge said elements toward each other with a compressive force to establish a drive through the friction clutch, and means operative to reduce the compressive force of said spring means on said friction clutch elements when the ball ramp mechanism senses a torque above the trip torque setting and the ball moves relative to the ball ramps to exert a separating force on said discs.

3. A power-transmitting device as defined in claim 2 wherein said friction clutch is a cone clutch.

4. A power-transmitting device as defined in claim 2 wherein at least one of the elements of the friction clutch is directly engaged by a disc.

5. A power-transmitting device as defined in claim 2 wherein there are a pair of said ball ramp mechanisms with a central disc positioned between a pair of outer discs and said central disc having ball ramps on opposite faces coacting with opposed ball ramps on the outer discs.

6. A power-transmitting device as defined in claim 5 wherein said friction clutch is positioned intermediate said outer discs.

7. A power-transmitting device as defined in claim 6 including means interconnecting said outer discs to limit their separating movement while permitting movement thereof toward said central disc, and said spring means acting on said means to urge said outer discs toward the central disc.

8. A power-transmitting device as defined in claim 7 wherein said elements of the friction clutch are positioned between said outer discs of the ball ramp mechanism whereby said spring means exerts said compressive force thereon by acting through said outer discs.

9. A power-transmitting device as defined in claim 7 wherein an element of said friction clutch is a cone-shaped element positioned between said outer discs, and said outer discs are shaped to engage surfaces of said cone-shaped element.

10. A power-transmitting device as defined in claim 2 including a clutch housing fixed to one of the discs of the ball ramp mechanism, and said spring means comprises a pair of springs with one spring acting between a shaft of said drive input and said one disc and the other spring acting between the clutch housing and said elements of the friction clutch.

11. A power-transmitting device as defined in claim 10 wherein said means operative to reduce the compressive force of the spring means comprises a push rod which operatively engages the ball ramp mechanism and the friction clutch when the torque exceeds the trip torque setting.

12. A power-transmitting device as defined in claim 2 wherein said friction clutch is a cone clutch, and there are a pair of said ball ramp mechanisms with a central disc common to both pairs positioned between a pair of outer discs and said central disc having ball ramps on opposite faces coacting with opposed ball ramps on the outer discs, means interconnecting said outer discs to limit their separating movement while permitting movement thereof toward said central disc, an element of said friction clutch being a cone-shaped element positioned between said outer discs with said outer discs being shaped to engage surfaces of said cone-shaped element, and said spring means exerting said compressive force to establish the drive through the friction clutch by acting through said outer discs.

13. A narrow torque tolerance range slip clutch for establishing a drive connection between aligned input and output shafts comprising: a friction clutch having interfitted clutch members with at least two clutch members operatively connected one to each of the input and output shafts; a ball ramp mechanism including a pair of facing discs with opposed ball ramps in which a ball is positioned and which are caused to move apart as the ball leaves a centered position in the ball ramps; spring means acting to urge said ball ramp discs toward each other and to exert a compressive force on said interfitted clutch members.

14. A slip clutch providing a narrow tolerance torque range in a drive connection between axially aligned input and output shafts comprising, a ball ramp mechanism having a pair of spaced-apart discs with opposed ball ramps and a ball positioned thereon with one of said discs fixed to the output shaft and the other floating relative thereto, a clutch housing, a plurality of compressively engaged clutch elements with at least one element connected to the clutch housing and one element connected to the input shaft, said clutch housing being fixed to said floating disc of the ball ramp mechanism and having a pair of spaced-apart flanges spanning said clutch elements with one flange engaging a clutch element and the other flanges spaced from the clutch elements, a ball ramp load spring acting between the output shaft and the floating disc of the ball ramp mechanism, a clutch load spring acting between said other flange and one of the clutch elements, and a push rod extended between the disc fixed to the output shaft and the clutch element engaged by the clutch load spring and having a length to only contact both the last-mentioned disc and clutch element when said ball ramp discs are caused to separate by a torque in excess of a trip torque established by the force of the ball ramp load spring.

15. A narrow torque tolerance range slip clutch for establishing a drive connection between aligned input and output shafts comprising: a friction clutch having interfitted clutch members with at least two clutch members operatively connected one to each of the input and output shafts and a movable member, and spring means positioned between said movable member and said clutch members for exerting a clamp load on said clutch members axially of said shafts; a ball ramp mechanism including a pair of facing discs with opposed ball ramps in which a ball is positioned and which are caused to move apart as the ball leaves a centered position in the ball ramps; spring means engaging one of said discs urging said ball ramp plates toward each other; and said spring-engaged disc and said movable member being rigidly interconnected.

16. A slip clutch providing a torque limiting drive connection between axially aligned input and output shafts comprising: a ball ramp mechanism including a center disc connected to one of said shafts and a pair of side discs positioned one at either side of said center disc and spaced therefrom, the adjacent faces of said discs being provided with opposed ball ramps and a ball positioned in each pair of opposed ball ramps, means movably interconnecting said side discs to permit relative movement therebetween while limiting the maximum separation therebetween, a clutch pack positioned between the side discs of the ball ramp mechanism and having clutch elements some of which are keyed to said side discs and others of which are operatively connected to the other of said shafts; and spring means urging said side discs toward each other to exert a clamp load on said clutch pack and the occurrence of a certain torque level in the slip clutch resulting in said balls acting in said ball ramps to exert a force resulting in reduction of the clamp load and which with the force exerted against a ball ramp side disc by the clutch pack is in force balance with the force of said spring means.

17. A slip clutch with a narrow tolerance torque range comprising, a clutch pack having a clutch housing and plurality of interengaging clutch members operatively connected some to an input shaft and others to an output shaft, a torque-sensing ball ramp mechanism, spring means associated with the clutch housing and the ball ramp mechanism exerting a compressive force on the ball ramp mechanism and the clutch pack with a reaction force on the clutch housing, and means interconnecting said ball ramp mechanism and said clutch pack whereby at a certain torque level said ball ramp mechanism establishes a force which is operative to achieve a force balance with said spring means and said reaction force on said clutch housing in order to relieve only that portion of the force of the spring means which would cause the clutch pack to transmit an unacceptable overload.

* * * * *